United States Patent [19]

Savage

[11] E Patent Number: Re. 32,354

[45] Reissued Date of Patent: Feb. 17, 1987

[54] CONTAINER FOR HOLDING AND DISPENSING FLUID

[75] Inventor: Chester Savage, Irvine, Calif.

[73] Assignee: Scholle Corporation, Irvine, Calif.

[21] Appl. No.: 707,698

[22] Filed: Mar. 4, 1985

Related U.S. Patent Documents

Reissue of:

[64] Patent No.: 4,375,864
Issued: Mar. 8, 1983
Appl. No.: 170,541
Filed: Jul. 21, 1980

[51] Int. Cl.[4] ..... B67B 7/24

[52] U.S. Cl. ..... 222/81; 222/105; 222/464; 222/499; 222/501; 222/559; 141/349; 251/149.1

[58] Field of Search ..... 222/80, 81, 89–91, 222/105, 464, 499, 501, 531, 559; 141/348, 349; 251/149.1

[56] References Cited

U.S. PATENT DOCUMENTS

| | | | |
|---|---|---|---|
| 574,583 | 1/1897 | Springer et al. | 222/80 |
| 824,391 | 6/1906 | Toomey | 222/501 |
| 2,252,543 | 8/1941 | Beeh | 222/501 |
| 3,106,321 | 10/1963 | Gorman | 222/542 |
| 3,768,501 | 10/1973 | Elson et al. | 251/149.1 |
| 3,871,422 | 3/1975 | Elson et al. | 251/149.1 |
| 3,908,864 | 9/1975 | Capper | 222/105 |
| 3,963,147 | 6/1976 | Waters | 222/105 |
| 3,977,569 | 8/1976 | Scholle | 222/105 |
| 3,990,608 | 11/1976 | Walters | 222/91 |
| 4,098,438 | 7/1978 | Taylor | 251/149.1 |
| 4,105,139 | 8/1978 | Scholle | 222/105 |
| 4,159,790 | 7/1979 | Bailey | 222/464 |

FOREIGN PATENT DOCUMENTS

| | | | |
|---|---|---|---|
| 23412/35 | 7/1935 | Australia | 222/542 |

*Primary Examiner*—H. Grant Skaggs

[57] ABSTRACT

A container for holding and dispensing fluid has a flexible bag to which a spout is connected. A specially designed adapter within the spout has an opening sealed by a plug. A tubular probe is inserted into the adapter opening and snapped onto the plug. The connected probe and plug are pushed into the bag to permit fluid to flow through apertures in the probe. The probe channel is filled with fluid before insertion into the bag, thus introducing substantially no air into the system. Withdrawing the probe snaps the plug back into the adapter to re-seal the bag without substantial introduction of air, and without any leakage.

9 Claims, 9 Drawing Figures

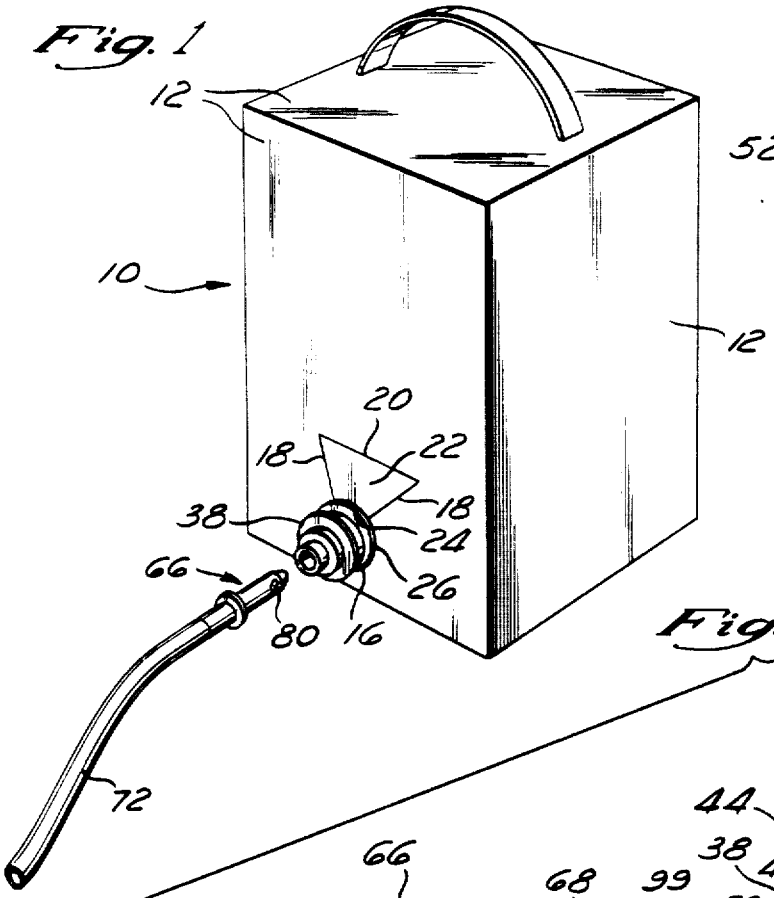
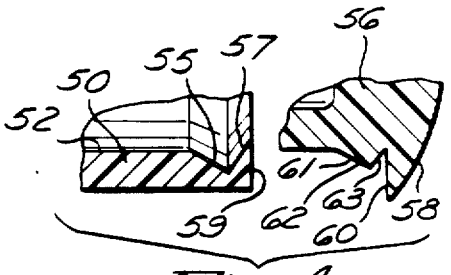
Fig. 4
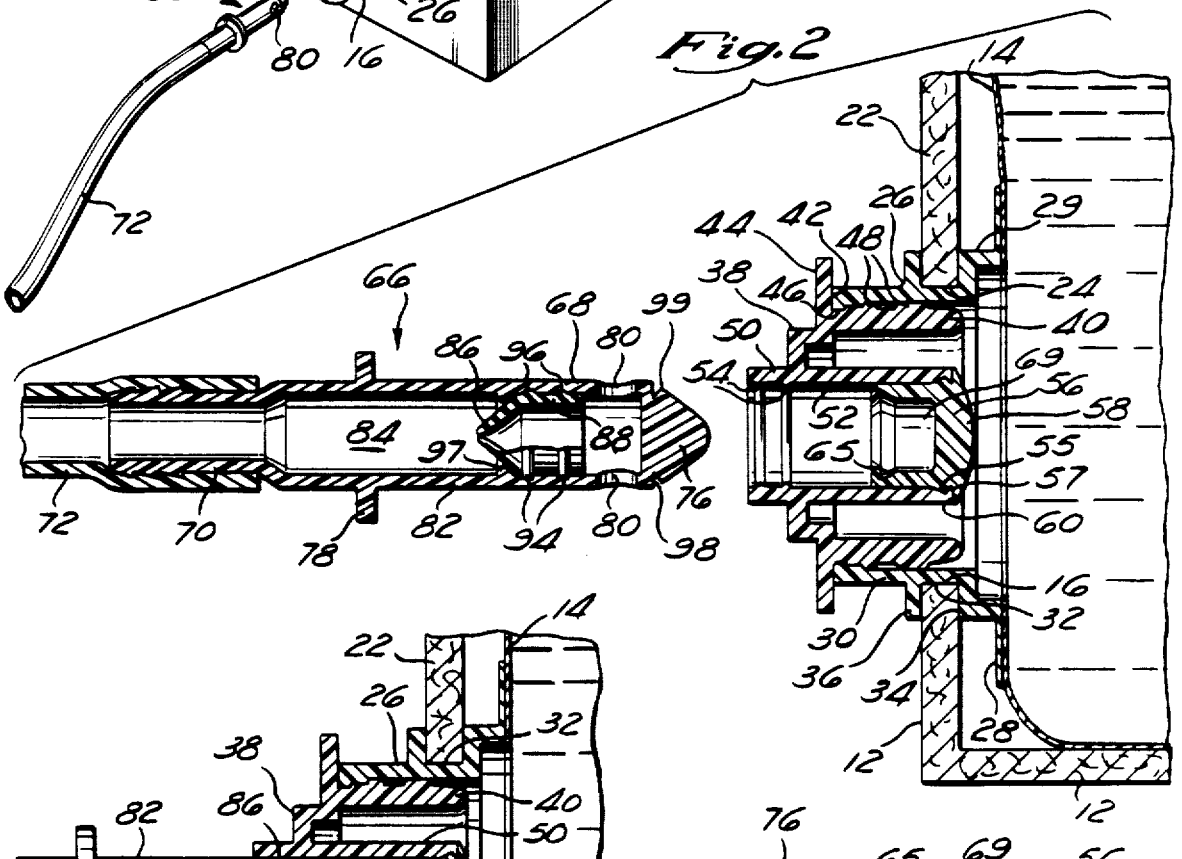
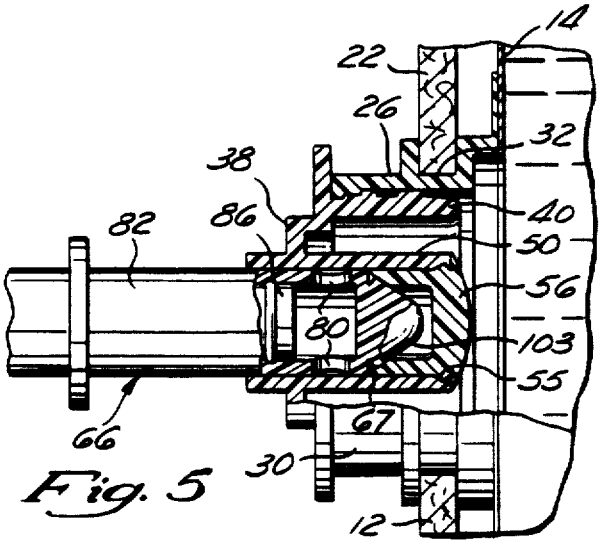
Fig. 5
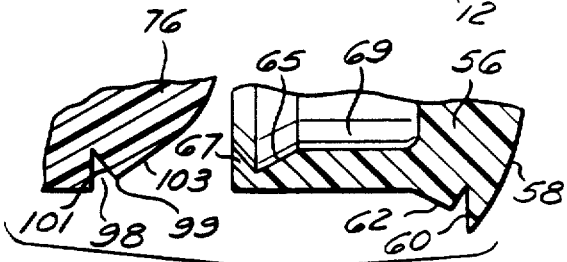
Fig. 3

Fig. 6
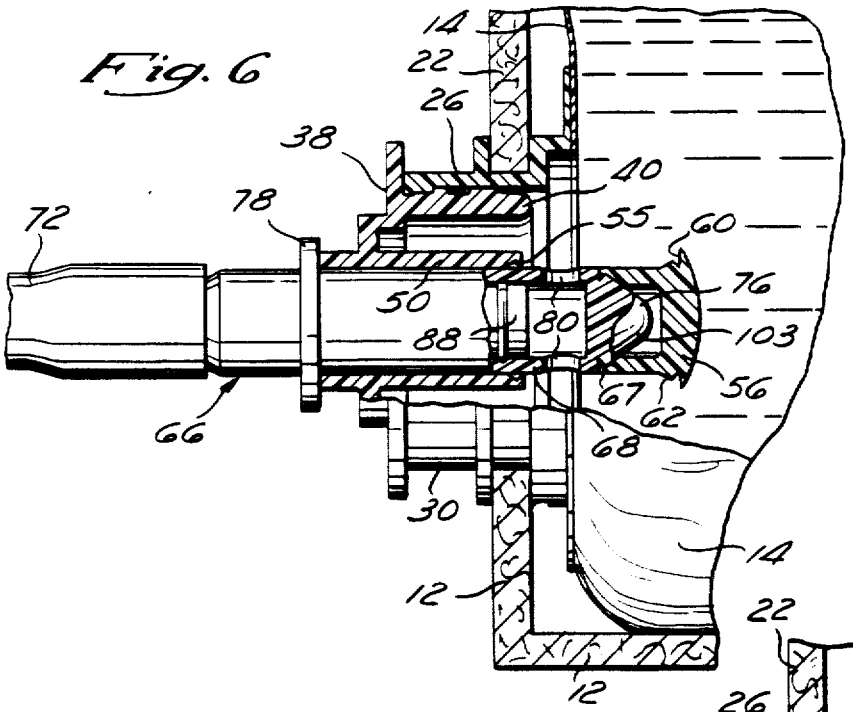
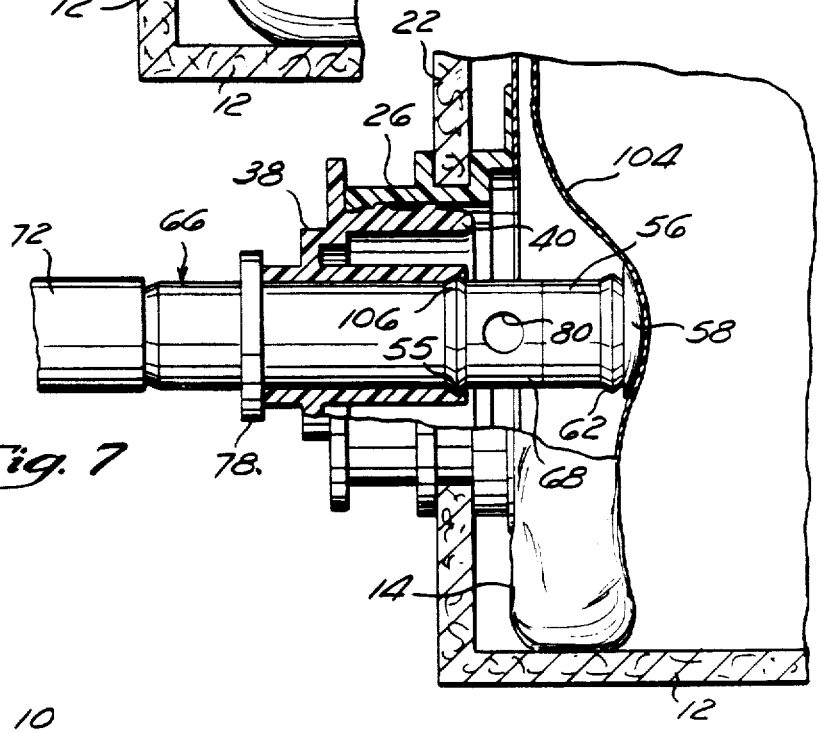
Fig. 7
Fig. 9
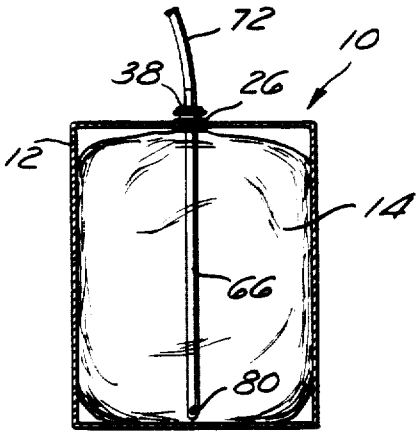
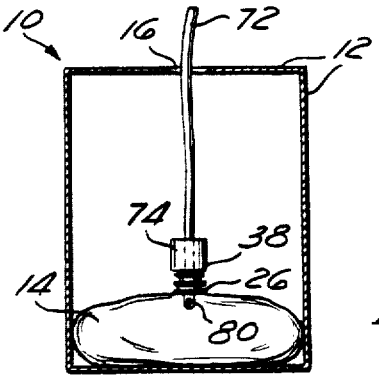
Fig. 8

CONTAINER FOR HOLDING AND DISPENSING FLUID

Matter enclosed in heavy brackets [ ] appears in the original patent but forms no part of this reissue specification; matter printed in italics indicates the additions made by reissue.

BACKGROUND OF THE INVENTION

The invention is generally related to containers having a collapsible plastic bag containing fluid and means for dispensing this fluid from the bag. More specifically, the container bags often are filled with liquid which can be contaminated by air, and therefore the fluid must be dispensed from the bag without a substantial introduction of air.

A container presently becoming more widely used for dispensing fluids such as milk which deteriorate in contact with air consists of a thin-film plastic forming a bag within a cardboard box. The plastic bag is filled with the liquid and as the liquid is removed, the bag collapses within the box so that no air need enter the bag to replace the dispensed liquid and therefore no air contamination occurs. Presently post-mixed syrup for use in fountains, for example, in mixing soft drinks at a bar is held in a stainless steel container from which it is pumped to a dispensing nozzle where it is mixed with other ingredients. It is desired to substitute the plastic bag system referred to above for the stainless steel containers.

It is important that no air be introduced into this system for several reasons. First, air may be harmful to the pump. Secondly, the air dilutes the syrup which is dispensed in a measured mixing ratio with other ingredients in order to produce the soft drink. Thirdly, air can be detrimental to the fluid itself. It is not only important to be able to dispense the fluid without introducing air, but it is also advantageous for the container to be able to be re-sealed without introduction of air. This allows for changing the fluid container when only partially empty permitting its re-use at a later time. In the re-sealing, none of the fluid escapes to create a messy and unsanitary condition with, for example, syrup dripping from the container.

Many different types of containers and dispensing mechanisms for containers have been developed in the past. None, however, satisfy the requirements for a fluid dispensing system as described above.

SUMMARY OF THE INVENTION

The inventive container is composed of a flexible plastic bag which is supported by a rectangular box typically made of cardboard. A spout is connected to the bag and extends through an orifice in one of the walls of the container. A specially designed adapter is retained within the spout. The adapter has a central bore communicating with the interior of the bag and sized to receive a plug that seals the bore through a snap connection, thereby preventing fluid from flowing out of the bag.

An elongate probe which is sized to pass sealingly through the bore is inserted into the bore and engages the plug through a second snap connection. As the probe with the engaged plug passes further into the bore, the plug is pushed interior of the container, thereby breaking the adapter-plug seal. It is important that the plug-adapter snap connection be more difficult to release than the probe-plug snap connection is to effect, so that the probe and plug can be mutually engaged before the plug slides within the bore to break the seal.

The probe and bore of the adapter have means for creating a seal between them to prevent fluid from escaping after the plug is disengaged from the bore. It is thus important that the sealing means between the bore and probe be positioned so that the bore-probe seal is effected before the plug-bore seal is broken. The probe has an interior channel for dispensing the fluid which passes through apertures in its insertion end. The other end of a probe is connected to a hose which leads to a suitable container for further mixing the fluid. The hose and probe are filled with fluid before insertion into the adapter bore to prevent air contamination of the fluid in the bag.

The mutually engaged probe and plug are pushed into the interior of the container, to allow fluid to flow through the apertures in the end of the probe beginning the dispensing process. The plug is retained on the end of the probe to prevent it from falling into the container and to permit it to be returned to its closing position within the adapter when the probe is withdrawn. The plug is appropriately spaced from the apertures in the end of the probe to ensure that the walls of the bag do not interfere with the liquid flowing through the apertures as the bag collapses during the dispensing process. This allows virtually all of the fluid to be dispensed from the container. The probe may possess a locking rib which locks the probe in its extended position within the interior of the bag.

If desired, the probe and plug can be withdrawn, thereby re-sealing the adapter bore again without introduction of air and without fluid spillage or drip. In order to accomplish this, it is important for the plug-adapter snap connection to be easier to effect than the probe-plug snap connection is to release. Thus, the plug is replaced with the adapter-bore and the probe and plug are disengaged. This allows containers which are only half empty to be re-sealed without introduction of air, and to be re-used at a later time.

In a further embodiment of the invention, the spout and adapter are positioned through the top wall of the box, but are not attached to the box wall. The spout, adapter and attached bag are allowed to collapse downward with the fluid level as fluid is dispensed. This allows the probe apertures to remain in communication with the fluid in the bag throughout the dispensing process. Alternatively, the spout and adapter may be affixed to the top wall. In this embodiment, the probe is of a longer length sufficient to tranverse from the top to the bottom of the box, thereby permitting the probe aperture to remain in communication with the fluid until the box is virtually empty of fluid.

These and other advantages of the invention will be clarified and discussed below with reference to the drawings in which:

FIG. 1 is a perspective view of an upright fluid container with the probe ready to be inserted in the spout;

FIG. 2 is an enlarged sectional view of the connector assembly and probe in approximately the position of FIG. 1;

FIG. 3 is a fragmentary, sectional view of the mutually engaging portions of the probe and plug;

FIG. 4 is a fragmentary, sectional view of the mutually engaging portions of the adapter and plug;

FIG. 5 is a partial sectional view of the connector assembly similar to FIG. 2, but showing the probe and plug in their intermediate, engaged position;

FIG. 6 is a partial sectional view of the connector assembly similar to FIG. 2, but showing the probe and plug in their fully extended dispensing position;

FIG. 7 is a partial sectional view of the connector assembly similar to FIG. 2, but showing the probe and plug in their fully extended position with the fluid in the container substantially depleted;

FIG. 8 shows an alternative embodiment of the invention in which the connector assembly system moves downward with the bag as the fluid is depleted; and FIG. 9 shows a further alternative embodiment of the invention with a probe of increased length.

DETAILED DESCRIPTION OF THE PREFERRED EMBODIMENT

Referring to FIGS. 1–4, a container 10 for holding and dispensing fluids includes a rectangular box having six walls 12 which are typically formed of a material such as cardboard. The walls 12 provide support for a flexible fluid containing bag 14 which is housed within the box. The bag preferably is made of plastic film and will typically contain a fluid such as syrup, milk or other liquid which can be contaminated by exposure to air.

One of the walls 12 has a circular orifice 16 extending therethrough. Located above the orifice 16 are two slits 18 which are cut through the cardboard side wall 12 and extend upward and diagonally outward from each other. Connecting the slits 18 is a fold line 20 in the side wall 12. The slits 18 and fold line 20 allow a section 22 of the carboard side wall 12 to be folded upward and outward along the fold line 20 in a flap-like fashion. A fourth side 24 of the foldable section 22 is arcuately shaped to fit flush against a circular *outer* spout 26.

The spout 26 is connected to the bag 14 by means of an annular flange 28 as shown in FIG. 2. Extending outward from the flange 28 is a reduced diameter collar 29 and then a further reduced diameter neck portion 30 which extends through the orifice 16 in the side wall 12. The step in diameters from the collar to the neck forms a circular shoulder 34 which abuts the inside surface of the box wall 12. A second annular flange 36 around the neck portion 30 outward of the shoulder 34 abuts the outer surface of the box wall 12 and with the shoulder forms an annular recess 32. The recess 32 contains the portion of the wall 12 forming the periphery of the orifice 16. The spout 26 is placed within the orifice 16 with the flap section 22 folded upward. The remainder of the periphery of the orifice 16 is engaged within the recess 32. By folding the section 22 downward and engaging it within the recess 32, the spout 26 is locked into position.

Extending into the spout 26 is an adapter *or inner spout* 38. The adapter 38 has a cylindrical wall 40 which is positioned within the spout 26. A shoulder 42 formed by an annular flange 44 on the wall 40 abuts the neck portion 30 of the spout 26 to limit extension of the adapter 38 into the spout 26. The outer part of the neck portion 30 has protuberances 46 which extend radially inward and seat against the wall 40 of the adapter 38. In a like manner, the wall 40 of the adapter 38 has sealing ribs 48 which seat against the neck portion 30 of the spout 26. The protuberances 46 and the sealing ribs 48 not only provide a tight seal between the neck portion 30 of the spout 26 and the wall 40 of the adapter 38, but also lock the adapter 38 within the spout 26. The adapter 38 has an inner cylindrical wall 50 which forms a central bore 52 that provides communication between the interior of the bag 14 and the exterior of the container 10. Extending radially inward from the exterior end of the wall 50 are two sealing ribs 54. As most clearly shown in FIG. 4, the interior end of the inner wall 50 has a circular notch 55 which has a corresponding circular rib 57.

Positioned within the bore 52 is an essentially cylindrical plug 56. The plug 56 is sized to fit coaxially within the bore 52. The plug has a convex cap 58 of enlarged diameter which forms an annular shoulder 60 that abuts the inner end 59 of the cylindrical wall 50, forming a seal. As shown most clearly in FIG. 4, the plug 56 has sides 61 and 63 which are located below the shoulder 60 and which extend radially outward to form a ridge 62. The ridge 62 and the notch 55 in the adapter 38 cooperate in a snap-type connection to lock the plug 56 in its sealing position within the bore 52. As most clearly shown in FIG. 3, the plug 56 has a groove 65 defining a ridge 67 in a central cavity 69.

The adapter 38 and the plug 56 are removed from the spout 26 as a unit to initially fill the container, and then are re-inserted in the spout as a unit to seal the filled container.

In FIG. 2, a probe 66 is shown aligned with the bore 52. The probe 66 is an elongate tubular member which is sized to fit within the bore 52. The probe 66 has an upstream end 68 and a downstream end 70. The downstream end 70 is attached in a conventional manner to a hose 72 which leads to a dispenser nozzle (not shown). The upstream end 68 of the probe tapers into a head 76. Located between the downstream end 70 and the head 76 is a ring flange 78 which has a larger diameter than the diameter of the body of the probe 66. Located slightly downstream of the head 76 are apertures 80 which extend through the wall 82 of the probe 66. The apertures 80 provide communication between the exterior and the axial channel 84 through the length of the probe.

Located between the flange 78 and the aperture 80 is a check valve 86, shown as a slit flapper, but which may be of any suitable type. The check valve 86 is locked in position within the channel 84 by means of locking ribs 94 extending radially outward from the cylindrical body 88 and engaging recess 96 within the outer wall 82 of the probe 66. An annular rib 97 extending radially inward from the outer wall 82 serves to further lock the valve 86 in position. The check valve 86 prevents fluid contained within the channel 84 downstream of the check valve from flowing through the valve and out of the apertures 80. The check valve 86 therefore allows the probe 66 and hose 72 to be filled with liquid downstream of the valve prior to insertion of the probe 66 into the bore 52. This is quite important in preventing the introduction of air into the fluid as will hereinafter be described.

As most clearly shown in FIG. 3, the head 76 of the probe 66 has a peripheral notch 98. The notch 98 has a corresponding rib 99 which is formed by sides 101 and 103 which extend radially outward. When the probe is inserted into the bore 52 as will hereinafter be described, the rib 99 fits within the groove 65 in the plug 56 and the ridge 67 fits within the notch 98 to connect the probe 66 and the plug 56. With respect to the probe 66 and the plug 56, by "connect" is meant to fixedly fasten the probe 66 and the plug 56 one to the other so that force must be exerted to separate them.

The cooperation of the ridge 67 with the notch 98 and the rib 99 with the groove 65 ensures that the probe 66 and the plug 56 cannot be moved apart unless a longitudinal pulling force is applied to them. Such a force is required by the need to move the rib 99 over the ridge 67 before the plug 56 and the probe 66 can be separated.

The spout 26, the adapter 38, the plug 56 and the probe 66 are preferably of a semi-rigid plastic material such as polyethylene with sufficient resiliency to form good seals.

Referring to FIG. 5, the probe 66 is shown in an intermediate position in which it has been inserted into the bore 52 engaging the plug 56 by means of the snap fitting between the rib 99 on the probe head 76 and the plug groove 65 within the cavity 69. It is important that the snap fitting between the ridge 62 on the plug 56 and the notch 66 in the inner wall 50 of the adapter 38 be more difficult to release than the snap fitting between the probe 66 and the plug 56 is to effect. This allows the probe 66 and the plug 56 to be mutually engaged before the seal provided by the cap 58 is broken.

It should be understood that the side 103 of the probe 66 forms a cam surface which approaches the plug ridge 67 at an obtuse angle tending toward 90°. This allows the side 103 to cam the ridge 67 radially outward to permit the rib 99 to easily engage the groove 65. In contrast, the side 63 of the plug 65 forms an acute angle with the rib 57 of the adapter 38, thereby making it relatively difficult for the plug ridge 62 to force the adapter rib 57 radially outward to break the seal. Thus, the snap fitting between the plug 56 and the inner wall 50 of the adapter 38 provides a resistance to movement of the plug 56, thereby allowing the snap fitting between the probe 66 and the plug 56 to be effected. If the snap fitting between the plug 56 and the inner wall 50 of the adapter 38 were not more difficult to release than the snap fitting between the plug 56 and the probe 66 was to effect, the probe 66 would simply push the plug 56 into the bag 14 without the probe 66 being engaged with the plug 56.

The adapter sealing ribs 54 engage with the outer wall 82 of the probe 66 to provide a seal between the probe 66 and the inner wall 50 of the adapter 38. It is important that the sealing ribs 54 be positioned so that the seal between the probe 66 and the inner wall 50 of the adapter 38 is effected before the seal provided by the plug 56 is broken. If such were not the case, liquid would be able to flow out of the bag 14 and between the probe 66 and inner wall 50, thereby not only spilling fluid but also introducing air into the bag.

It should also be understood that the section of the channel 84 distal to the check valve 86 and the hose 72 is filled with fluid before insertion. This means that the only section of the probe 66 which contains air is that section between the check valve 86 and the head 76. The total volume of this section is very small and contains a relatively insubstantial amount of air which will not significantly contaminate the fluid in the bag 14.

Referring to FIG. 6, the probe 66 is shown in its fully inserted position in which the apertures 80 are in communication with the fluid in the bag 14. Thus, fluid can freely flow through the apertures 80, through the check valve 86, and through the hose 72 into a suitable container. As discussed above, the only air which has been introduced into the interior of the bag which holds the fluid was contained in the probe between the head 76 of the probe 66 and the check valve 86. The probe is inserted until the flange 78 abuts the upper surface of the annular inner wall 50 of the adapter 38. The flange 78 therefore serves to limit passage of the probe 66 through the bore 52. The plug 56 is retained on the probe 66 by means of the snap connection discussed above, thereby preventing the plug 56 from becoming unattached with the bag 14.

Referring to FIG. 7, the probe 66 is shown again in its fully extended or dispensing position. The fluid in the bag 14 has been almost fully dispensed. As the bag 14 empties of fluid, the walls 104 of the bag begin to collapse around the plug 56. The plug 56 is spaced a proper distance from the probe 66 to hold the collapsing bag away from the apertures 80, thereby ensuring that the walls 104 do not interfere with fluid entering the apertures 80. This permits virtually all of the fluid in the bag 14 to be removed from the container 10. If the plug 56 extended significantly further into the interior of the bag 14, the bag 14 would have a tendency to collapse behind the plug 56 possibly blocking the apertures 80. Conversely, if the plug extended a relatively short distance beyond the probe 66, the bag 14 again would tend to collapse around the apertures. Thus, it is important that a balance be struck, with the plug 56 being spaced a sufficient distance from the apertures 80 to provide a small cavity between the apertures 80 and the bag 14. Located slightly distal to the apertures 80 is an optional locking flange 106 (shown in FIG. 7 only) which mates with the notch 55 in the inner wall 50 of the adapter 38. The locking flange 106 resists the probe 66 and engaged plug 56 being inadvertently pulled from the interior of the bag 14.

The invention allows the bag 14 to be re-sealed by the plug 56. For example, if one wish to change containers when the bag 14 were only partially empty, the probe 66 would simply be withdrawn from the bore 52, thereby replacing the plug 56 in its sealing position as shown in FIG. 2 with the bag being re-sealed without spillage or introduction of air. It is important that the snap connection between the probe 66 and the plug 56 be more difficult to release than the snap connection between the plug 56 and the inner wall 50 of the adapter 38 is to effect. The bore 52 is relatively easy to re-seal because the side 61 of the plug 56 approaches the rib 57 of the adapter 38 at an obtuse angle tending toward horizontal. This allows the ridge 62 to cam the rib 57 radially outward so that the ridge 62 can engage the notch 55 effecting the seal. In contrast, the side 101 of the probe 66 forms a relatively acute angle tending toward vertical with the plug ridge 67 making it more difficult for the probe 66 to disengage from the plug 56. Thus, the snap connection between the probe 66 and the plug 56 provides a resistance to the probe 66 disengaging from the plug 56. This resistance to the disengagement allows the snap fitting between the plug 56 and the adapter 38 to be effected, thereby re-sealing the bore 52. Thus, the snap fittings between the probe 66 and the plug 56 and the snap fitting between the plug 56 and the adapter 38 are easy on/hard off snap connections.

Referring to FIG. 8, a modification of the invention is shown. In this embodiment, the orifice 16 for the spout 26 and adapter 38 has been positioned in an upper wall 12. Thus, as fluid is dispensed from the bag 14, the fluid level drops downward away from the orifice 16. Since the bag 14 is sealed to the flange 28 of the spout 26, if the spout 26 were attached to the wall 12, the fluid level would soon drop below the apertures 80 in the probe 66, therefore terminating all further dispensing of fluid. However, as shown in FIG. 8 in this embodiment, the spout 26 and the adapter 38 are not affixed to the wall 12 and therefore allow the bag to collapse downward as fluid is dispensed, with the spout and probe going down with the collapsing bag 14. A sufficient length of hose 72 is provided to extend into the container 10 to its bottom. A weight 74 attached to the spout assures that the spout moves down as the fluid is dispensed from the bag. In the FIG. 8 embodiment, preferably the spout 26 and the adapter 38 are mounted within the side wall orifice 16 which is surrounded by an annular tear-away strip (not shown). This tear-away strip can be disengaged from the side wall 12, thereby releasing the spout from the side wall. This, in turn, allows the spout 26 and the adapter 38 and the bag 14 to collapse with the fluid in the bag permitting the apertures 80 in the probe 66 to remain in communication with the fluid.

Referring to FIG. 9, a further embodiment of the invention is shown. Like the embodiment shown in FIG. 8, the orifice 16 is again positioned through an upper wall 12. In this embodiment, however, the spout 26 and the adapter 38 remain attached to the wall 12. If the probe were of a length as shown in FIGS. 1–8, the fluid level would quickly drop below the apertures 80 in the probe 66, thereby terminating further dispensing of fluid. However, in this embodiment, the probe 66 is of a much longer length and is inserted to extend the full length of the container 10 to its bottom. Thus, the apertures 80 will remain in communication with the fluid throughout the dispensing process.

What is claimed is:

1. A connector for dispensing fluids from a container having a fluid storage portion and a spout opening comprising:
   (a) an elongate member having an interior channel to transport said fluid having an entrance from the exterior and said member being sized to closely fit within said opening; and
   (b) a plug positioned within said opening which seals said opening through first snap fitting, said plug and said member being mutually engageable by means of a second snap fitting, said plug and said member being mutually slidable while engaged to permit said channel entrance to extend into the storage portion of the container to dispense fluid, said first fitting being more difficult to release than said second fitting is to effect, thereby ensuring that the member and plug are mutually engaged before said plug and member are slid into the storage portion breaking the seal.

2. The connector of claim 1 wherein said second fitting is more difficult to release than said first fitting is to effect to permit said plug to be repositioned within said opening to reseal the opening before said member and plug can be disengaged.

3. The connector of claim 1 wherein:
   said plug is a sufficient distance from said channel while said member and plug are mutually engaged within said storage portion of the container to prevent the walls of said storage portion from inhibiting the flow of fluid entering said channel.

4. The connector of claim 1 further comprising means cooperating with said member and said spout opening to form a second seal between the exterior of the member and the interior of the opening, said means positioned so as to effect said seal before said plug is slid into the storage portion breaking the seal.

5. A device for holding and dispensing fluid comprising:
   (a) a flexible bag supported by a rigid box;
   (b) a spout attached to said flexible bag;
   (c) an adapter positioned within said spout having a bore which provides communication between the interior of the flexible bag and rigid box exterior;
   (d) a plug sized to fit within said bore, said plug having a first position located within said bore and coaxial with said bore in which the bore is sealed and a second position in which the plug is exterior of the bore so the seal is broken;
   (e) a probe separable from said bore sized to fit coaxially within said bore having means for engaging said plug and for pushing said plug into said second position, said probe having an interior channel which extends through an opening in an exterior wall, said channel opening being positioned to effect communication with fluid in the bag while said plug is in the second position, said probe including means for selectively returning said plug to the first position for resealing the bore;
   (f) means for locking said probe in position within said bore while said channel opening is in communication with the fluid.

6. A fluid container adapted to dispense fluid through a probe having an interior fluid channel comprising:
   (a) a box;
   (b) a flexible bag supported within said box;
   (c) a spout separable from said probe attached to said bag;
   (d) an adapter positioned within said spout having a bore which provides communication between the interior of the flexible bag and the box exterior;
   (e) a plug sized to fit coaxially within said bore to seal said bore, said plug being releasable from said bore to permit movement into the interior of the flexible bag to break the seal in response to being pushed by said probe, said probe pulling said plug back into sealing engagement with said bore when said probe is removed from the interior of said flexible bag.

7. A device for holding and dispensing fluids, comprising:
   (a) a container having a fluid storage portion;
   (b) a spout opening attached to said container which permits fluid to flow from the fluid storage portion to the exterior of the container;
   (c) means for dispensing a fluid from said container, said dispensing means having an interior channel to transport said fluid in communication with the exterior, said channel being substantially free of gaseous material to prevent contamination of said fluid;
   (d) means for sealing said spout opening positioned within said opening;
   (e) means for engaging said sealing means with said dispensing means, said engaging means comprising a first snap fitting between said dispensing means and said sealing means, said dispensing means having means for positioning said channel within the storage portion of the container by removal of said sealing means from said spout opening to break the seal, said sealing means having means to prevent said removal until said dispensing means and said sealing means are in mutual engagement, said removal prevention means comprising a second snap fitting between said sealing means and said spout opening, said second snap fitting being more difficult to release than said first snap fitting is to effect; and (f) means cooperating with said dispensing means and said spout opening for securing the interface between said dispensing means exterior and said spout opening against passage of fluid, said securing means being positioned to effect securing before said sealing means is removed.

*8. A container adapted to dispense fluid comprising:*

*(a) a fluid container;*

*(b) a spout attached to said container, said spout having a bore which provides communication between the interior and the exterior of the container, said bore being adapted to receive a dispenser probe having an interior fluid channel; and*

*(c) a plug sized to fit coaxially within said bore to seal said bore, said plug being coaxially slidable within said bore to extend into the interior of said container flexible bag to break the seal in response to being pushed by said probe and having means for fixedly fastening the plug to said probe so that the plug will move axially with the probe in said bore when being pushed or pulled, the plug being fixedly fastened to said probe upon axial pushing engagement by said probe before breaking said seal, said plug adapted to be pulled by said probe back into sealing engagement with said bore, and then to separate from said probe during axial pulling removal of said probe from the interior of said bore.*

*9. The container of claim 8, wherein said fluid container is a flexible bag, further comprising a box within which said bag is supported.*

* * * * *

UNITED STATES PATENT AND TRADEMARK OFFICE

CERTIFICATE OF CORRECTION

PATENT NO. : Re. 32,354

DATED : February 17, 1987

INVENTOR(S) : Chester Savage

It is certified that error appears in the above-identified patent and that said Letters Patent is hereby corrected as shown below:

Claim 8 (Column 10, line 4), delete "flexible bag".

Signed and Sealed this

Twenty-eighth Day of September, 1993

*Attest:*

*Attesting Officer*

BRUCE LEHMAN

*Commissioner of Patents and Trademarks*